(12) United States Patent
Eghbal

(10) Patent No.: US 9,887,612 B1
(45) Date of Patent: Feb. 6, 2018

(54) LINEAR ACTUATOR WITH BUILT-IN ENCODER

(71) Applicant: Fariborz Aaron Eghbal, Beverly Hills, CA (US)

(72) Inventor: Fariborz Aaron Eghbal, Beverly Hills, CA (US)

(73) Assignee: MOTICONT, Van Nuys, CA (US)

( * ) Notice: Subject to any disclaimer, the term of this patent is extended or adjusted under 35 U.S.C. 154(b) by 519 days.

(21) Appl. No.: 14/309,806

(22) Filed: Jun. 19, 2014

(51) Int. Cl.
*H02K 33/16* (2006.01)
*H02K 41/035* (2006.01)

(52) U.S. Cl.
CPC .................................. *H02K 41/035* (2013.01)

(58) Field of Classification Search
CPC ...... H02K 33/16; H02K 29/06; H02K 41/031; H02K 41/03; H02K 41/02
See application file for complete search history.

(56) References Cited

U.S. PATENT DOCUMENTS

| 5,434,549 | A | * | 7/1995 | Hirabayashi | H02K 33/00 335/229 |
| 5,801,462 | A | * | 9/1998 | Yagoto | H02K 41/03 310/12.04 |
| 5,872,407 | A | * | 2/1999 | Kitaoka | H02K 41/03 310/12.14 |
| 6,417,587 | B1 | * | 7/2002 | Komatsu | H02K 29/08 310/68 B |
| 8,415,838 | B1 | | 4/2013 | Eghbal | |
| 2011/0127940 | A1 | * | 6/2011 | Lee | G11B 7/0037 318/400.39 |

* cited by examiner

*Primary Examiner* — Dang Le
(74) *Attorney, Agent, or Firm* — Thomas I. Rozsa

(57) ABSTRACT

A linear motor which includes a bobbin with an interior lengthwise axial opening with a permanent magnet assembly within the opening and electricity carrying coils wound on an exterior of the bobbin which creates a force when electricity runs through the wound coils as a result of interaction between the magnetic field created by the magnet assembly, and the current passing through the coil wires, that enables the magnet assembly to move in an axial direction within the bobbin. The bobbin includes an encoder within an interior wall and an encoder scale strip affixed to the magnet assembly so that the encoder can detect the position of the magnet assembly.

8 Claims, 12 Drawing Sheets

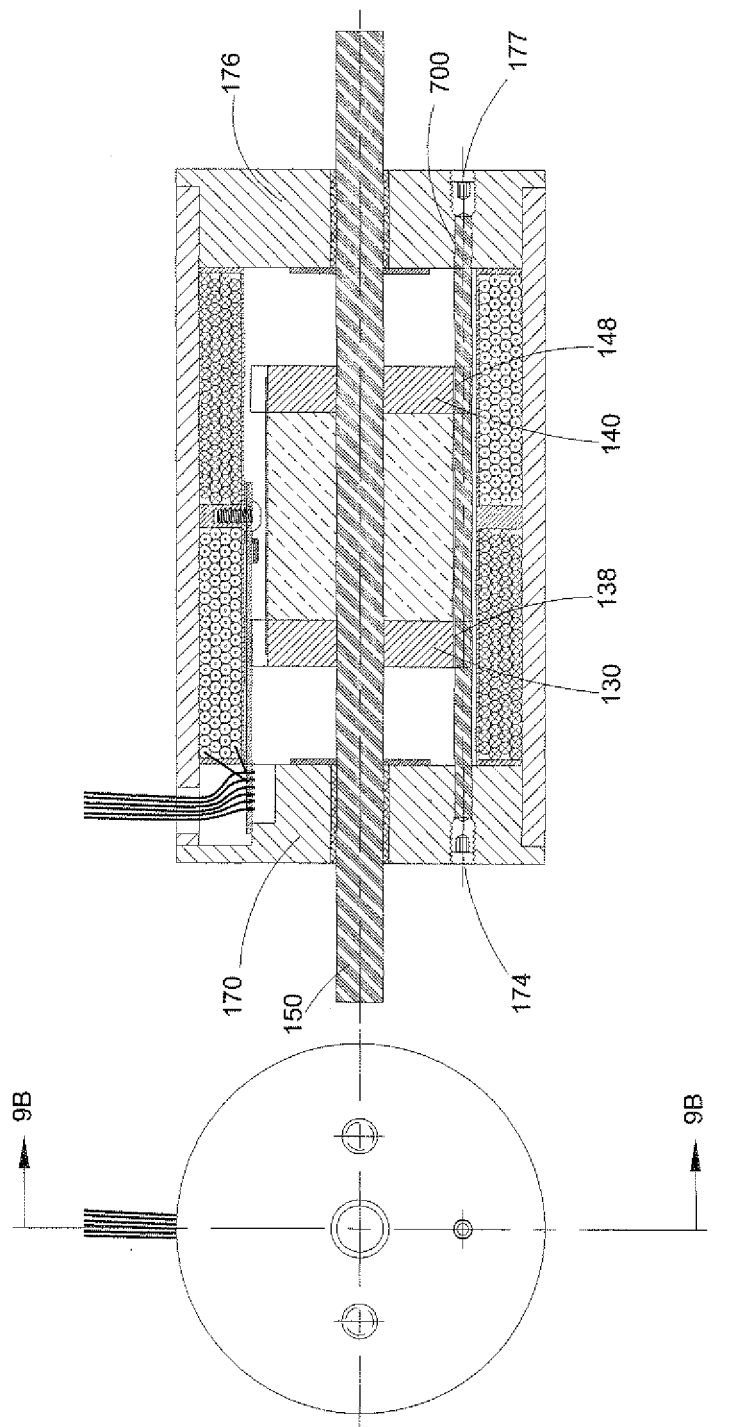

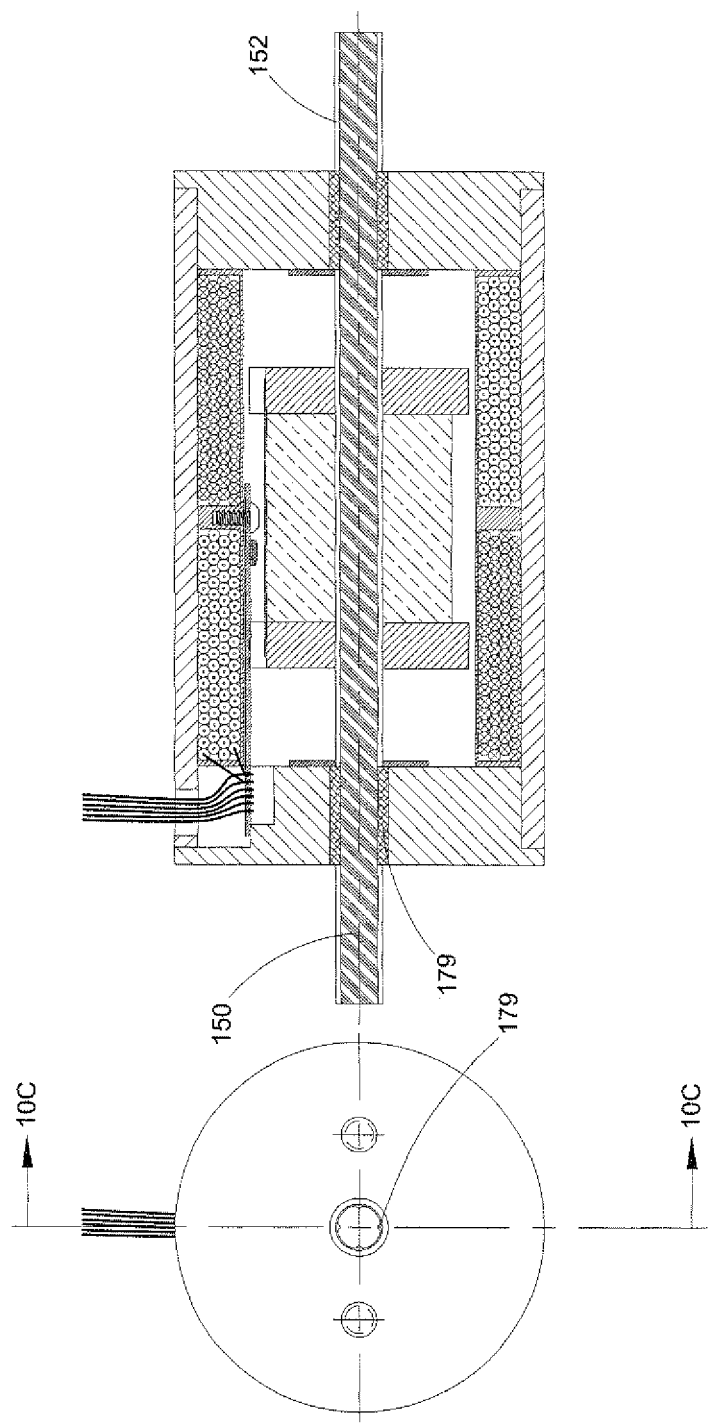

LINEAR ACTUATOR WITH BUILT-IN ENCODER

BACKGROUND OF THE INVENTION

1. Field of the Invention

The present invention relates to the field of linear motors and actuators which include a coil surrounding a magnet assembly. The present invention also deals with a type of position sensor which is used to detect the location of a magnet assembly in a coil. There are several different types of position sensors with different purposes. The present invention is an encoder which locates the position of a magnet within a coil.

2. Description of the Prior Art

Inventor Eghbal is a co-inventor of the invention disclosed and claimed in U.S. Pat. No. 8,415,838 issued on Apr. 9, 2013. This patent disclosed and claimed a bobbin assembly surrounded by a coil through which electrical current is transmitted. A magnet rested inside of the bobbin. The bobbin was encapsulated in a housing having one opened end which permitted axial motion of the bobbin when the magnetic field produced by the permanent magnet interacted with an electric current that passed through the wires.

There is a significant need for an improved actuator which accurately sets and measures a distance of movement for premise movement applications.

SUMMARY OF THE INVENTION

The present invention is a linear motor which includes a bobbin with an interior lengthwise axial opening with a magnet assembly within the opening and electricity carrying coils wound on an exterior of the bobbin which creates a magnetic field when electricity runs through the wound coils that enables the magnet assembly to move in an axial direction within the bobbin. The bobbin includes a position sensor or encoder within an interior wall and an encoder scale strip affixed to the magnet assembly so that the encoder can detect the position of the magnet assembly.

The present invention is a linear actuator which has a built in position sensor. It is made of a moving magnet with a pair of disc pole heads on either side of it. The center part is a magnet with steel pole heads on either end. The magnet assembly is the moving part. The magnet assembly is within a bobbin that has an interior chamber in which the magnet and steel pole head assembly moves in an axial direction. The outer surface of the bobbin is a stationery coil that has two or more chambers in it with electrical conducting wires wound in opposite directions in each adjacent consecutive chamber. In the case of a coil with two chambers, in one chamber the electrical wires are wound in a clockwise direction and in the next chamber the electrical wires are wound in a counterclockwise direction. The bobbin includes at least two chambers with a middle separator where the coil formed from the wound electrical wires runs from one end to the middle separator with layers of electrical wires wound in one direction (either clockwise or counterclockwise) and the other half of the bobbin has the coil formed from electrical wires wound in the exact opposite direction. The number of chambers can be at least two, but it could be more. There can be any number of layers of winding on each chamber with at least one layer of winding in each chamber with adjacent layers of winding going in opposite directions. Each winding section between an end and a middle separator is called a chamber and there can be as many chambers as desired. While two chambers are illustrated, any additional odd or even number of chambers are within the spirit and scope of the present invention.

Within the chambers is an interior hollow core. Inside the interior hollow core is a central moving magnet assembly which includes a permanent magnet formed in one piece or in a multiplicity of pieces with adjacent north south poles between the pieces, and a pair of steel disc pole heads respectively on either side of the permanent magnet. One end of the permanent magnet is north and the other end is south. The steel disc pole heads are on a shaft with a permanent one or multiple-piece magnet(s) in between. It is preferably a one-piece magnet with a north pole at one end and a south pole at the other end. The steel pole heads may have a larger diameter than the magnet, in which case there will be a flat channel that is cut into the steel pole heads deep enough to be in the same level with the exterior circumference of the magnet. An encoder strip is affixed to the magnet and runs from a channel cut into one pole head, along an aligned exterior surface of the magnet, and onto the channel at the next pole head.

Another configuration can be a magnet with the same diameter as the steel pole heads with a matching axial notch. An encoder strip is affixed to the magnet and runs from a channel cut into one pole head, along an aligned notch of the magnet, and onto the channel at the last pole head.

In another configuration, the steel poles heads may have the same diameter as the magnets, while the magnet and pole heads are made without an axial notch. In this case, the encoder strip is affixed to the magnet and runs from one end of the magnet assembly to the other end.

The affixation means of the encoder strip to the magnet assembly in all above configurations can be adhesive or any other mechanical means.

The encoder is inside the chamber of the bobbin and is affixed to a circumferential wall of the chamber.

The encoder and the encoder strip produce the position information that can be used with a motion controller for precision positioning.

Most magnet wires are copper, however, other current carrying metals such as aluminum magnet wires could also be used. The length of the magnet and one pole head is approximately equal to the length of its corresponding chamber. The idea is to ensure that there is always one pole head in one chamber. Each pole head should be in each respective chamber.

There is a steel housing that goes over and around the coil. The coil is stationary with the purpose of completing the magnetic path produced by the magnet assembly.

The magnetic field produced by the permanent magnet travels in a closed path, starting from the pole of a magnet, through one pole piece, then crossing the coil in its corresponding chamber into and through the outer steel housing, continuing its path by crossing the coil in the adjacent chamber to its corresponding pole piece and back to the other pole of the magnet.

In the drawings, the circles with center points represent the current coming out of the cross section and the circles with x's represent the current going into the cross section which represents the direction of the current in the left chamber.

The direction of current is reversed in the adjacent chamber. The electrical current goes vertically up out of the paper and then back into the paper on the other side. The interaction between magnetic field generated by the permanent magnet assembly and the current passing through the coil creates an axial force. Since the direction of the current and the direction of the magnetic field are opposite in the two adjacent chambers, the forces are added, based on the Lorentz Force Law (right hand rule). Reversing the polarity of the current causes the magnet assembly to move in the opposite direction.

The coil leads along with the encoder wires will be connected to a motion controller system in order to control the axial motion of the motor.

In order for the encoder to function properly, there has to be an anti-rotation mechanism to prevent the magnet and the pole heads from rotating within the coil. By preventing such rotation, the encoder strip on the magnet and pole heads is aligned with the encoder. If they become misaligned, then the encoder would not be able to detect the position information.

A long pin which runs parallel to the axis of motion fits within its corresponding slots or openings on the pole heads and is fixed to the actuator body from either or both ends. This will keep the magnet assembly from rotating because it is necessary for the scale to move in a linear axis without rotation. It is necessary for the encoder to be facing the encoder strip on the magnet assembly. If the magnet assembly rotates, the encoder cannot detect the position information.

An alternative method to keep the shaft and magnet assembly from rotating is to use a shaft with an out of round cross section with a matching bearing. This includes a square shaft with square bearings, a hexagonal shaft with a hexagonal bearing, a shaft with an axial keyway and a matching key protruding out of the inside diameter of the bearing and into the keyway of the shaft, or a spline shaft and bearing set.

The linear actuator utilizes a stationary coil and a moving magnet assembly. The moving magnet assembly is made of a cylindrical magnet with a pair of iron or steel discs called pole heads on either side. A long shaft is placed through the entire assembly. The entire magnet/disc/shaft assembly is fixed together by either adhesive or other mechanical means.

The coil is made of a bobbin (coil form) with two or more chambers. Each chamber is filled with magnet wire (coil), with the two adjacent coils being wound in opposite directions. Alternatively, the present invention may also use a single wire and change the direction of winding in each chamber. Each disc (also called steel pole head) in the moving magnet assembly corresponds to each coil in the coil assembly.

In the present invention, one design would have each disc (pole head) made with a slightly larger diameter than the cylindrical magnet. A notch is cut at the edge of each disc.

A strip of linear scale is attached to the outside surface of the permanent magnet (either by using an adhesive or other mechanical means) in an axial direction and aligned with the two notches on the two discs on either side of the permanent magnet.

An alternative design would have a magnet with the same diameter as the steel pole heads with a matching axial notch. An encoder strip is affixed to the magnet and runs from a channel cut into one pole head, along an aligned notch of the magnet, and onto the channel at the last pole head.

In another alternative design, the steel poles heads have the same diameter as the magnets, while the magnet and pole heads are made without an axial notch. In this case, the encoder strip is affixed to the magnet and runs from one end of the magnet assembly to the other end.

An encoder is placed on the inside diameter of the bobbin (either by using an adhesive or other mechanical means). The magnet assembly including the linear scale is then placed inside the coil assembly with the encoder being aligned with the two notches on the two discs (pole heads), so that the encoder faces the linear scale.

A steel housing surrounds the entire assembly. Two end plug covers (usually non-magnetic, but could also be magnetic depending on the design) are placed on either side of the housing. Each end plug cover has a linear bearing (or a hole being used as a linear bearing) in its center, where it supports the axial shaft that is attached to the moving magnet assembly.

The moving magnet assembly is kept from rotating by some means described below. When the moving magnet assembly moves back and forth within the coil assembly, the encoder can detect its location by facing the linear scale.

The moving magnet assembly may be kept from rotating in a number of ways. It may utilize another set of fixed linear shaft running parallel to the axis of motion which corresponds to another pair of notches on the steel discs.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated:

FIG. 9A is a front view of the linear actuator illustrated in FIG. 1 also showing wires coming out of the linear actuators, FIG. 9A being comparable to FIG. 2;

FIG. 9B is a cross-sectional view taken along Line 9B-9B of FIG. 9A illustrating an anti-rotation mechanism elongated shaft to prevent the magnet assembly from rotating relative to the linear actuator.

FIG. 10B is a front view of FIG. 10A, comparable to the view illustrated in FIG. 9A; and FIG. 10C is a cross-sectional view taken along Line 10C-10C of FIG. 10B illustrating a central out of round shaft running through the magnet assembly and either ends of the two end plug covers.

DETAILED DESCRIPTION OF PREFERRED EMBODIMENTS OF THE INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
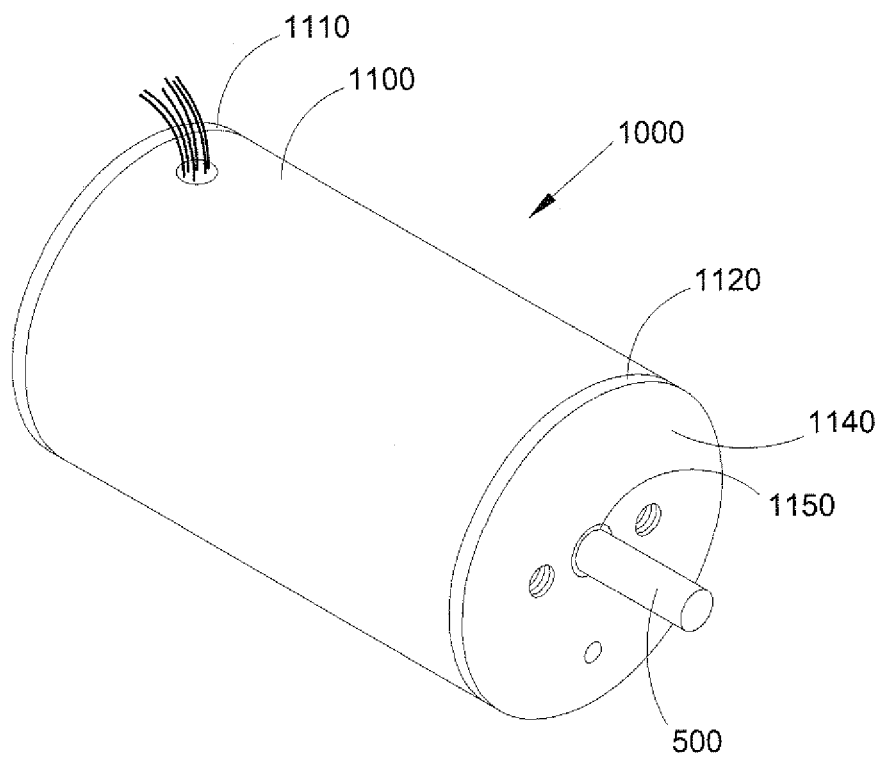
FIG. 1 is perspective view of a linear actuator showing the exterior housing and a second end plug cover as well as a central opening through which extends a shaft of the present invention.

Referring to FIG. 1, there is illustrated at 1000 the enclosed linear actuator having an outer housing sidewall 1100 with a first end 1110 and a second end 1120, the second end illustrating an exposed face 1140 of a plug assembly (to be described) and a central opening 1150 through which extends a shaft 500.

Figure 2:
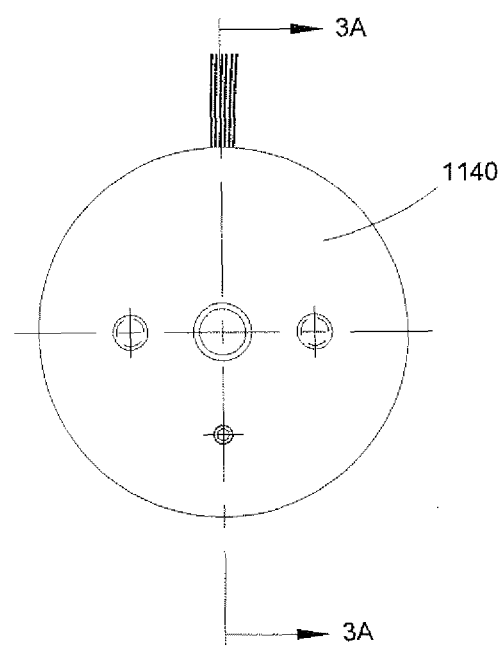
FIG. 2 is a front view of the linear actuator illustrated in FIG. 1 also showing wires coming out of the linear actuator.
Figure 3A:
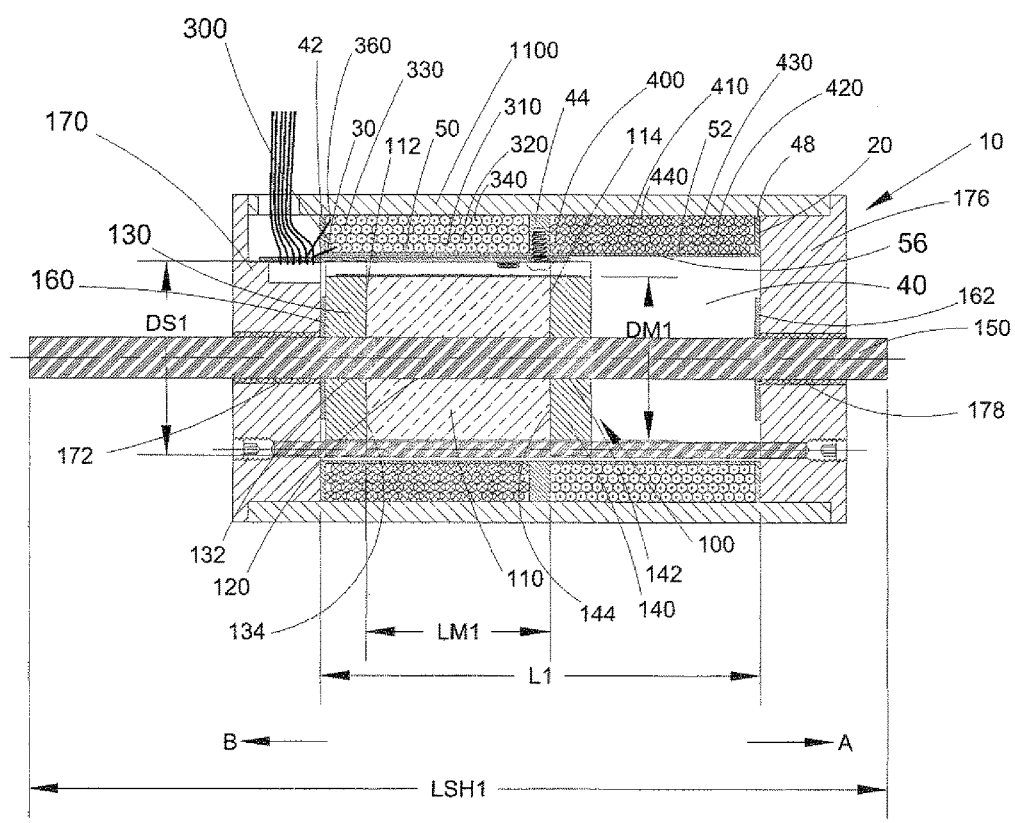
FIG. 3A is a cross-sectional view taken along line 3A-3A of FIG. 2.

Referring to FIG. 2, there is illustrated an end view of the second end 1120 of the linear actuator housing 1000 also illustrating wires extending out of an opening in the housing sidewall 1100. Referring to FIG. 3A, there is illustrated a cross-sectional view taken along line 3A-3A of FIG. 2, illustrating an embodiment of the present invention linear actuator motor 10. The linear actuator motor 10 includes a bobbin 20 having an inner cylindrical wall 30 with a central interior chamber 40 extending for the entire axial length "L1" of the bobbin 20. The bobbin 20 has a proximal barrier 42 extending to a first cylindrical outer wall 50 which extends to a middle barrier 44 extending to a second cylindrical outer wall 52 which extends to a distal barrier 48.

Within the central interior chamber 40 is an interior cylindrical wall 56 which extends the entire length "L1" of the bobbin 20.

The present invention includes a magnet assembly 100 which includes a permanent magnet 110 having a given length "LM1" and a given diameter "DM1". One end 112 is a pole such as a north pole and the opposite end 114 is a south pole. Either end 112 and 114 can be either pole. At the first end 112 of the magnet 110 is a first steel pole head 130 having a diameter "DS1" greater than (or equal to) the diameter of the magnet "DM1". At the second end 114 of the magnet 110 is a second steel pole head 140 having the diameter "DS1". The magnet 110 has a central opening 120 extending the length of the magnet 110, steel plate 130 has an aligned central opening 132 and steel plate 140 has an aligned central opening 142. A main moving shaft 150 extends through all three aligned openings 132, 120, and 142 and has a length "LSH1" which extends past the magnet assembly 100 on either end. The interior face 134 of first steel pole head 130 is affixed to the permanent magnet at end 112 and the interior face 144 of second steel pole head 140 is affixed to end 114 of magnet 110. The shaft 150 is affixed to the first steel plate 130 and the magnet 110 and the second steel plate 140 through their aligned openings 132, 120 and 142 so that the shaft 150 is affixed to the magnet assembly so they all move in the same axial direction. The axial direction of first movement is shown as "A" in FIG. 3A and the axial direction of second movement is shown as "B" in FIG. 3A.

A first optional damper 160 is adjacent to first end plug cover 170 and a second optional damper 162 is adjacent to second end plug cover 176. The ends of the central interior chamber 40 are closed by a first end plug cover assembly 170 and a second end plug cover assembly 176. Each end plug cover assembly includes a bearing 172 and 178 to support and guide the shaft 150 to pass through the end plug covers. The key innovation of the present invention is the addition of having the position encoder scale affixed to the magnet assembly so that the encoder which is affixed to the interior cylindrical wall 56 is aligned with the scale, and which encoder sends position information to a motion controller in order to control the axial motion of the magnet assembly 100 within the chamber 40.

Figure 3B:
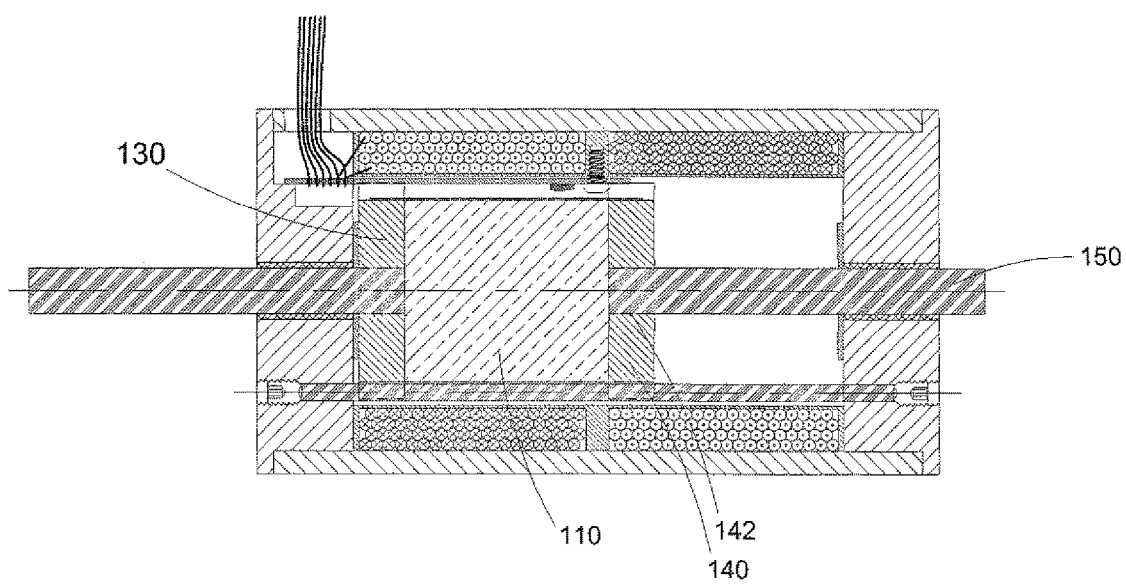
FIG. 3B is an alternative configuration using a solid magnet without a center hole, in this configuration, two shafts are attached to the steel pole heads which are then attached to the permanent magnet, the shafts are supported by the end plug covers.

An alternative configuration will be using a solid magnet without a center hole as shown in FIG. 3B. In this configuration, two shafts are attached to the steel pole heads which are then attached to the permanent magnet. The shafts are supported by the end plug covers as in the previous configuration.

It is within the scope and spirit of this invention that the shafts can have the same or different diameters or cross sections.

Figure 3C:
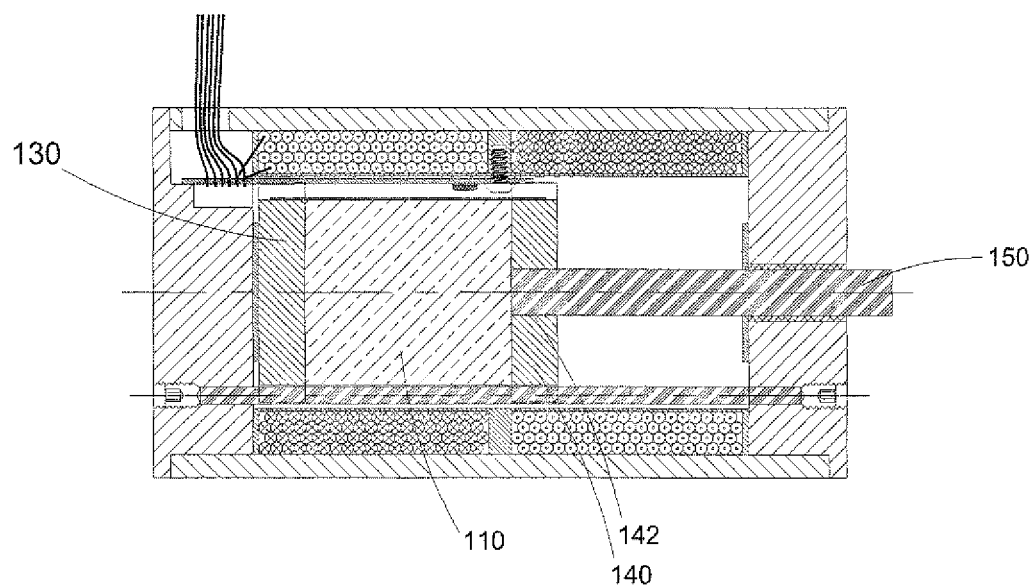
FIG. 3C is an alternative configuration using a magnet with or without a center hole and with only one shaft, in this configuration, the shaft is attached to one steel pole head which is then attached to the permanent magnet, the shaft is supported by the end plug cover as in the previous configuration.
Figure 4:
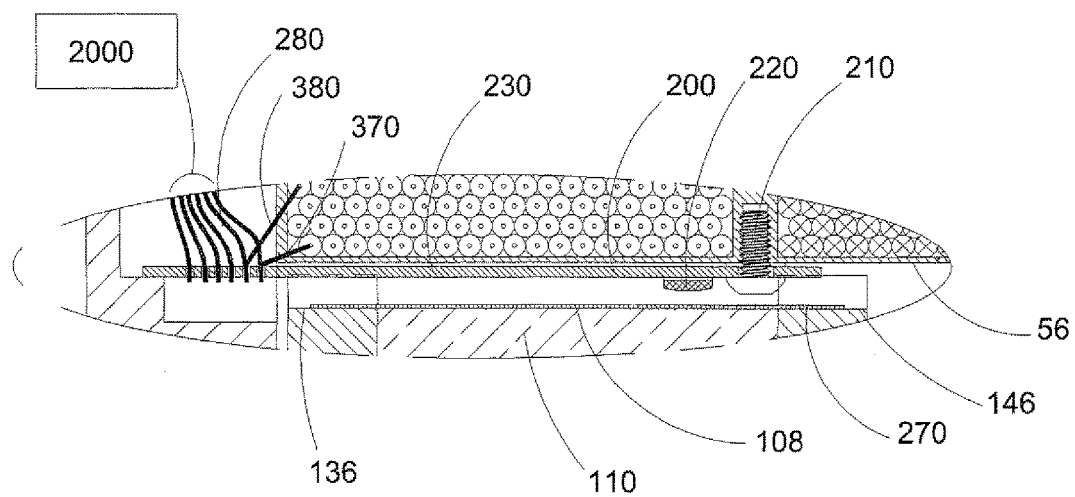
FIG. 4 is an enlarged view of the area shown in FIG. 3A showing more details of the present invention's built-in encoder, the circuit board and the wires extending from the encoder to a motion controller.
Figure 5:
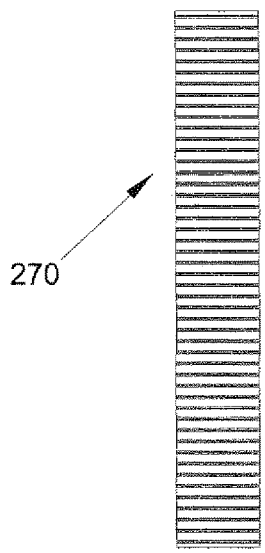
FIG. 5 is a front plan view of the linear scale.

Another alternative configuration will be using a magnet with or without the center hole and with only one shaft as shown in FIG. 3C. In this configuration, the shaft is attached to one steel pole head which is then attached to the permanent magnet. The shaft is supported by the end plug cover as in the previous configuration. The other end of the magnet is attached to a steel pole head without a shaft Referring to FIG. 4, there is shown an enlarged view of the interior of the chamber which includes having the encoder assembly 200 affixed to the interior wall 56 of chamber 40. Affixed to the magnet assembly is an encoder strip 270 which is illustrated in greater detail in FIG. 5. The encoder assembly 200 is permanently affixed to the interior wall 56 by the screw 210 or any other mechanical means such as adhesive, and extends along the distance of the wall such that the read head 220 is always capable of detecting the position information by facing the encoder strip at all times. The encoder read head 220 is aligned with the encoder strip 270 which is permanently affixed to the magnet assembly and if needed, by being permanently affixed to a cutout portion 136 of first steel pole head 130 along the exterior circumference 108 of the magnet and the cutout 146 of the second steel plate pole head 140.

The encoder has a body 230 which is connected to a multiplicity of electrical connecting means such as pins or wires which in a preferred embodiment would be wires 280 which are connected to a motion controller 2000 which receives the position information from the encoder. The motion controller processes the encoder position information and provides electrical current to the coil in order to axially move or position the magnet assembly 100.

The read head 220 is on the interior circumference 56 of the bobbin 20 where the magnet 110 is moving in an axial direction. The read head 220 needs to be at a location where it can always detect the position information of encoder strip 270. The magnet 110 and the first steel pole head 130 have a length that covers the length of the first winding and the intermediate barrier, and the second pole head 140 begins after the barrier 44 ends. In the illustrated drawings, the configuration is shown where the steel pole heads 130 and 140 are cut with the notch deep enough so that they are inline with the exterior circumference 108 of the magnet 110 and the encoder strip 270 is glued to the interior cut portion 134 and 144 of the steel plate pole heads 130 and 140 and to the exterior circumference 108 of magnet 110.

The encoder example in this invention represents any type of position sensor having any shape and form and may use numerous techniques to detect the motion of the moving part. This includes without limitation optical, magnetic, capacitive, inductive, resistive, sonar or mechanical position sensors. Any of these are within the spirit and scope of the present invention.

The direction of winding in the first chamber can be clockwise or counter-clockwise. The direction of the winding in the adjacent chamber (second chamber) must be the opposite of the first (previous) chamber. If there are more than two chambers, the direction of winding in the third chamber will be opposite to the direction of winding in the second chamber. This sequence will be repeated for any additional chamber. The wire in each chamber will be wound in the opposite direction to its adjacent chamber.

Referring to FIG. 3A, the winding for the electrical wires begins as follows. The first end of the electrical wires 300 starts to the outside of proximal barrier 42 of bobbin 30 and extends for a first winding 310 which extends for the entire length of the first cylindrical outer wall 50 with the first winding 310 coming out of the paper from the top portion of the drawing as shown with circles with center points and then going into the paper at the bottom portion of the drawing in the same chamber as shown with circles with x's, extending to middle barrier 44 and then going through the gap and into second wall 52 with a first lower winding of 400 and continuing to the distal barrier 48 of bobbin 30. If the winding in the first series of windings 310 is in the counterclockwise direction and the second series of windings 410 is in the clockwise direction. There is then a second layer that is wound in the second chamber which is layer 420 going over the first layer of windings 410 going in the same clockwise direction and then going past the middle barrier 44 and then going into second row of windings 320 which is in the counterclockwise direction. The winding then continues in the same chamber in the counterclockwise direction for winding layer 330 continuing to the middle barrier 44 to the third row of windings 430 in the clockwise direction and then continuing for a forth row of windings 440 before crossing the middle barriers 44 to go back to the front end of the wire with windings 340 in the counterclockwise so that it is wound at the front end 360. Therefore, the figure shows four rows of windings although it will be appreciated that any number of rows are within the spirit and scope of the present invention.

It should be appreciated that the wire may be wound in any number of layers in the first chamber, then pass through the gap in the middle barrier to the second chamber and be wound in the opposite direction in as many layers as needed, and then move back to the first chamber and be wound in the same direction as the previous layers in the first chamber. For example, if a total of four layers in each chamber are required, one may wind two layers in counter-clockwise direction in the first chamber, follow to the second chamber and wind four layers in the clockwise direction and then back to the first chamber to wind two additional layers on top of the original layers in the counter-clockwise direction.

If desired, the start wire 300 and the end wire 360 may be attached to the encoder body with wires 370 and 380 to be connected to the controller as two wires within the bundled wires 280.

Figure 6:
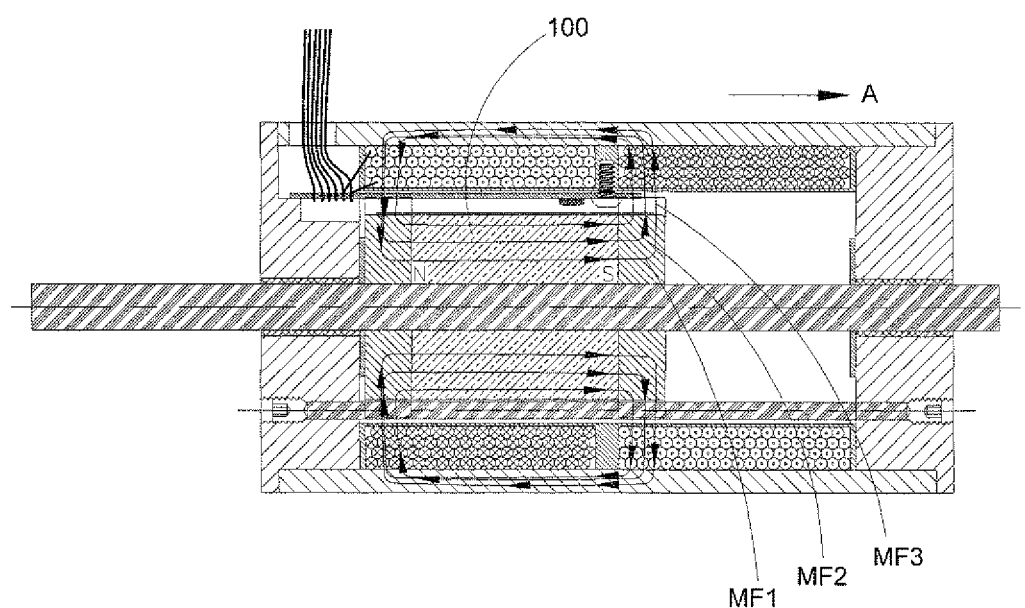
FIG. 6 is a cross-sectional view showing the magnetic fields going through a pair of adjacent windings where the windings in one section are in the opposite direction from the windings of the second section showing the magnetic fields going through a pair of windings.

Referring to FIG. 6, the magnetic field created by the magnet assembly is shown as the lines MF1, MF2 and. MF3. When current is applied to the coil, as a result of interaction between the magnetic field and the current, an axial force is produced according to the Lorentz Force Law (right hand rule) which causes the magnet assembly 100 to move in the axial direction "A".

Figure 7:
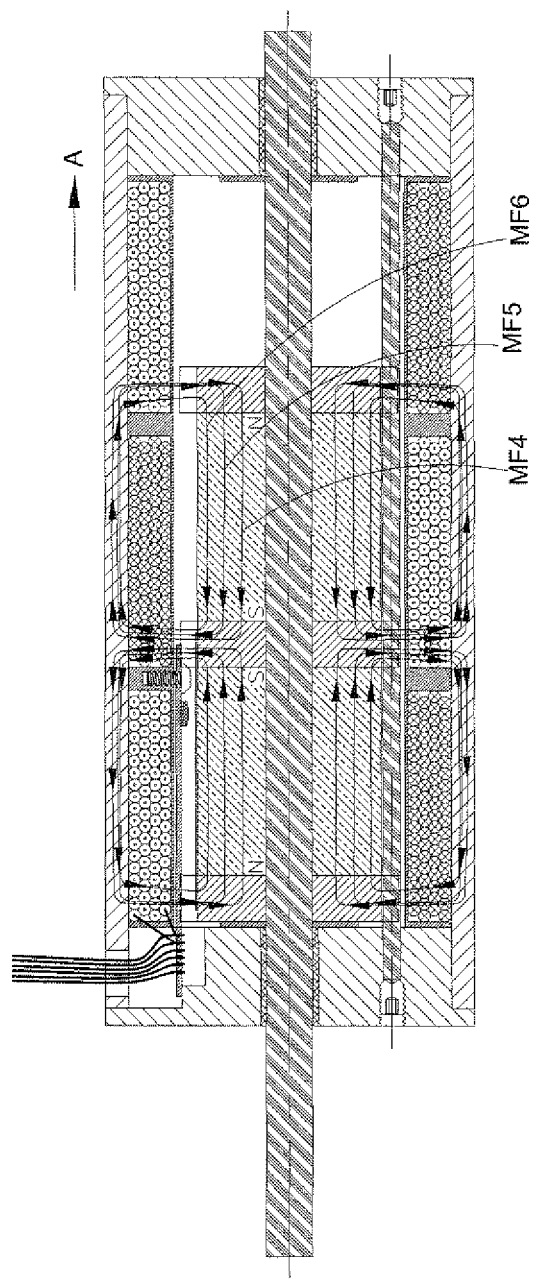
FIG. 7 is a cross sectional view showing more than one pair (two chambers) of windings. This figure shows a coil with three chambers where the direction of winding is reversed in each adjacent chamber. The figure also presents equal number of pole heads to each chamber, showing the direction of magnetic field going through each winding.

FIG. 7 shows a configuration in which the motor is made with more than two chambers. The figure shows three chambers with two magnets and three steel pole heads. Any number of chambers can be used, as long as there is one corresponding pole head for each chamber with magnets in between each two pole heads. The direction of winding in each chamber is in the opposite direction to the adjacent chamber. The direction of magnetism in each permanent magnet is also in opposite direction to the adjacent permanent magnet. Each set of pole head and winding produces a force. The forces, according to the Lorentz Force Law (right hand rule) are all in the same direction and add to each other to create more force and cause the magnet assembly to move in the axial direction "A".

The magnetic field shown in the second chamber is MF4, MF5 and MF6.

The number of chambers can be odd or even. The number of layers can also be odd or even. If an odd number of layers is used, the end of the wire needs to be pulled over the coil to the starting point. This may cause some inefficiency due to the wasted space. The wires can exit the motor at either end or any other location on the motor as required by the design. It is most convenient to have all the wires at one location but it is within the spirit and scope of the present invention that the coil winding wires can egress at different locations.

The encoder assembly 200 consists of a read head 220 mounted on a printed circuit board (PCB) 230. Read head 220 needs to be at a location where it can always detect the position information of the encoder strip 270.

With respect to wires, preferably the wires on the coil can both be on one end. That is the preferred embodiment. The wires on the coil can also be on either end or any other point on the motor.

Figure 8:
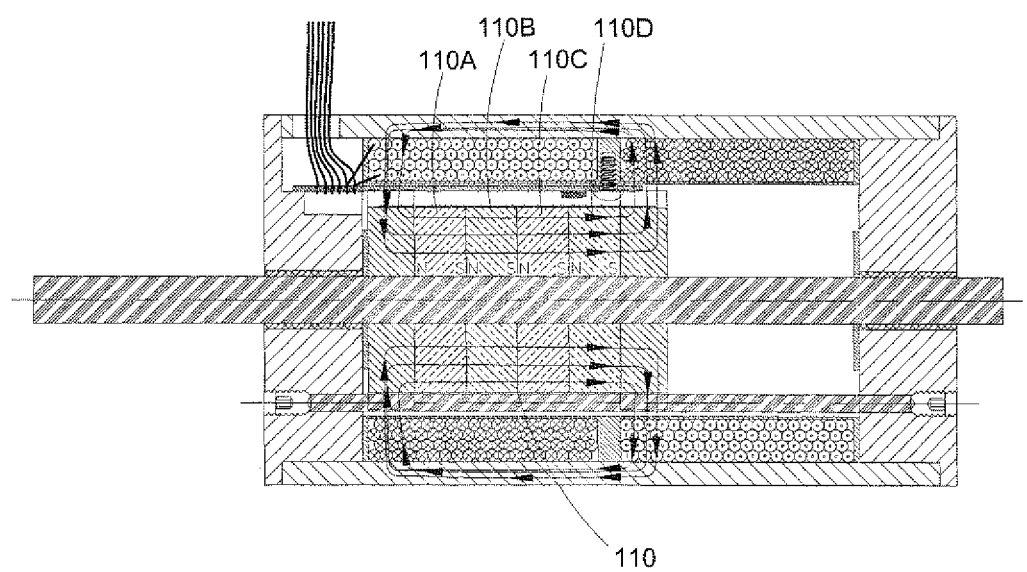
FIG. 8 is a cross-sectional view of the magnetic poles as illustrated in FIG. 6 but with the magnet in multiple pieces rather than in a single piece.

Referring to FIG. 8, a cross-sectional view of the winding is shown which is conceptually identical to the winding shown in FIGS. 6 and 7 but in this case, the magnet 110 is broken into several sub-groups of magnets which include 110A, 110B, 110C and 110D with the north pole facing a south pole of each respective magnet so that they are affixed together. The magnetic field is the same as shown in FIG. 6 and the fact that the magnet is in several pieces rather than one piece does not change the magnetic field or the principles of the present invention.

As explained in the Summary of the Invention section, in order for the encoder read head to be inline with the encoder strip, it is necessary that there be an anti-rotation means which prevents the magnet assembly from rotating relative to the encoder read head. The encoder read head is fixed and cannot move. The magnet assembly is moveable in an axial direction. If the magnet assembly is allowed to rotate, then the linear strip 270 will be out of alignment with the encoder read head 220 and the system will not work. Therefore, it is necessary to have an anti-rotation mechanism.

Referring to FIGS. 9A and 9B, there is illustrated a cross-sectional view taken along Line 9-9 of the front view showing one anti-rotation mechanism. The anti-rotation mechanism is a long pin 700 which runs parallel to the axis of motion fits within the corresponding slots or openings 138 and 148 on the pole heads 130 and 140 and is fixed to the actuator from either or both plug ends 170 and 176. This will keep the magnet assembly from rotating because it is necessary for the encoder strip to move in a linear axis without rotation. It is necessary for the read head of the encoder to be aligned with the encoder strip on the magnet assembly at all times. If the magnet assembly rotates, the encoder read head cannot detect the position information.

A long pin 700 which runs parallel to the axis of motion fits within the corresponding slots or openings 138 and 148 in the pole heads 130 and 140. It is affixed to the actuator openings of the actuator end plug cover, one end at opening 174 in end plug 170 and the other end at opening 177 in end plug 176.

Figure 10A:
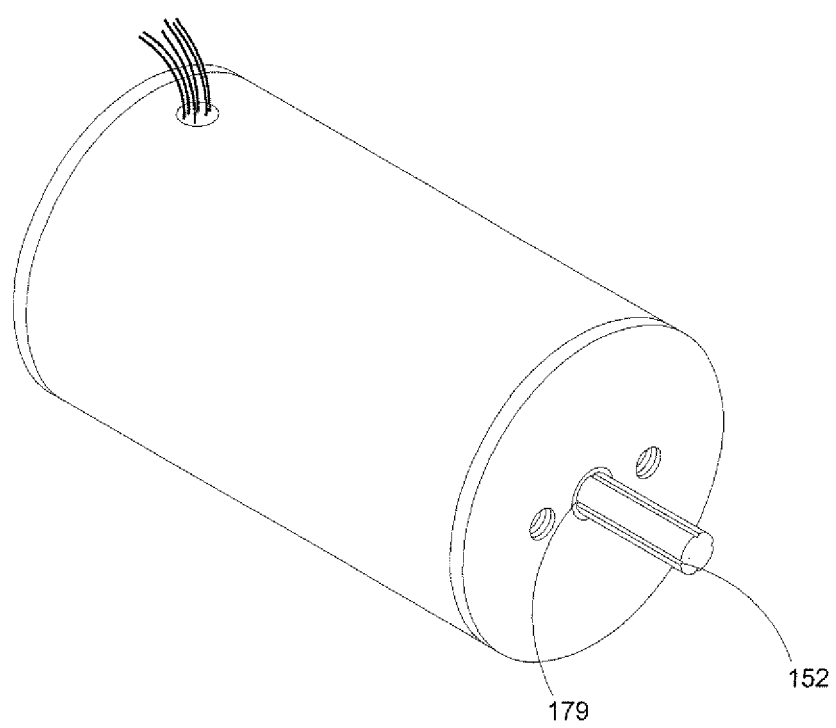
FIG. 10A is a perspective view of the linear actuator showing the exterior housing and a second end plug cover as well as a central opening through which extends out of the round shaft of the present invention.

Referring to FIGS. 10A, 10B and 10C, there is illustrated an alternative method where the shaft is cut in an out of round cross section to prevent rotation. FIG. 10A shows a perspective view of the entire encased actuator where the shaft is extending out of one end plug with an out of round cut and FIG. 10B is a front view of the encased actuator. FIG. 10C is a cross-sectional view taken along Line 10C-10C of FIG. 10B. The cross-sectional view also shows an out of round shaft. As discussed, an alternative method to keep the shaft from rotation is to have a system of shaft and bearings with matching non-circular cross sections. An example of this is shown in FIG. 10 in which the shaft 150 about which the magnet and pole heads move has a spline 152 such as one or more female axial grooves on the shaft with mating tongues (keys) 179 on the inside opening of the bearing through which the shaft moves. The tongue mating with the spline prevents the rotation of the magnet assembly. Other examples will be shaft and bearing sets with square or hexagonal cross sections.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A linear actuator comprising:
   a. a moving magnet assembly with a pair of moving steel pole heads on either side of a moving magnet assembly;
   b. the moving magnet assembly is located within a bobbin that has an interior chamber in which the magnet assembly moves in an axial direction, the outer surface of the bobbin is a stationery coil that has at least two chambers in the outer surface of the bobbin with electrical conducting wires wound in opposite directions in each adjacent consecutive chamber so that in one chamber the electrical wires are wound in either a clockwise or counterclockwise direction and in the next adjacent chamber the electrical wires are wound in an opposite either counterclockwise or clockwise direction;
   c. the outer surface of the bobbin includes at least two chambers with a middle separator between the at least two chambers where the coil formed from the wound electrical wires runs from one end to the middle separator with at least one layer of electrical wires wound in one direction and from the separator to an opposite end of the bobbin there is a coil formed from electrical wires wound in the exact opposite direction;
   d. within the bobbin is an interior hollow core where the moving magnet assembly is located, an encoder strip is affixed to the moving magnet assembly and runs from one steel pole head on one side of the magnet along an aligned exterior surface of the magnet and onto the steel pole head on an opposite side of the magnet;
   e. an encoder is positioned inside the chamber of the bobbin and is affixed to a circumferential wall of the chamber, the encoder strip attached to the moving magnet and aligned with the encoder which reads information on the encoder strip to produce position information of the moving magnet assembly which is used with a motion controller for precision positioning of an object affixed to an elongated shaft which runs through the moving magnet assembly;
   f. a given length of the magnet and one steel pole head is approximately equal to a given length of a chamber on the surface of the bobbin to ensure that there is always at least one steel pole head in each of the at least two chambers on the surface of the bobbin;
   g. a steel housing that goes over and around the coils in the chambers of the bobbin to complete a magnetic field produced by the moving magnet assembly;
   h. the magnet in the moving magnet assembly is a permanent magnet, a magnetic field produced by the permanent magnet travels in a closed path, starting from the pole of a magnet through the first steel pole head, then crossing a coil in a corresponding chamber aligned with the first steel pole head into and through the outer steel housing, continuing the magnetic field path by crossing a coil in an adjacent chamber to a second steel pole head located on the opposite side of the permanent magnet and back to an opposite pole of the magnet;
   i. electrical current in a coil in a chamber of the bobbin moves in a first direction and the direction of electrical current is reversed in an adjacent chamber;
   j. the interaction between a magnetic field generated by the moving magnet assembly and the current passing through the coils creates an axial force, with a direction of the electrical current in a coil and a direction of the magnetic field from the moving magnet assembly are opposite in the two adjacent chambers, the forces will be in the same direction and are added, reversing the polarity of the current causes the moving magnet assembly to move in an opposite direction; and
   k. the wound coils on the bobbin have two lead ends and the encoder has a circuit board with a multiplicity of lead ends, with lead ends of the coils and lead ends from the circuit board of the encoder connected to a motion controller that processes the encoder position information and provides electrical current to the coil in order to axially move or position the magnet assembly.

2. The linear actuator in accordance with claim 1, further comprising:
   a. an anti-rotation mechanism to prevent the magnet assembly with the encoder strip from rotating so that the encoder strip is always aligned with the encoder.

3. The linear encoder in accordance with claim 2, further comprising:
  a. the anti-rotation mechanism is a long pin which runs parallel to the axis of motion of the moving magnet assembly and fits within corresponding openings on the steel pole heads and is fixed to end caps on either side of the bobbin.

4. The linear encoder in accordance with claim 2, further comprising:
  a. the anti rotation mechanism is a shaft with an out of round cross section with a matching bearing extending through the moving magnet assembly and into the end caps on both sides of the bobbin.

5. The linear actuator in accordance with claim 1, further comprising:
  a. each steel pole head has a diameter larger than the diameter of the permanent magnet;
  b. each steel pole head has a notch;
  c. the encoder strip is attached to the outside surface of the permanent magnet in an axial direction and aligned with each of the respective notches on each of the steel pole heads on either side of the permanent magnet.

6. The linear actuator in accordance with claim 1, further comprising:
  a. the permanent magnet and each first and second steel pole heads on opposite sides of the permanent magnet have the same diameter with a matching axial notch in the permanent magnet and each of the two steel pole heads; and
  b. the encoder strip is affixed to the magnet and runs from a notch in a first steel pole head along an aligned notch in the permanent magnet, and onto the notch of the second steel pole head.

7. A linear actuator in accordance with claim 1, further comprising:
  a. a steel housing surrounds the bobbin and coils, and an end plug cover placed on either side of the housing and covering each end of the interior hollow core of the bobbin;
  b. each end plug cover has an opening with a linear bearing in a center location of each end plug; and
  c. an axial shaft extending through the two steel pole heads and the magnet of the magnet assembly, the axial shaft supported by extending through each respective opening and bearing of an end plug.

8. The linear actuator motor in accordance with claim 1, further comprising: the encoder is selected from the group consisting of optical, magnetic, capacitive, inductive, resistive, sonar and mechanical position sensors.

* * * * *